Figure 2:
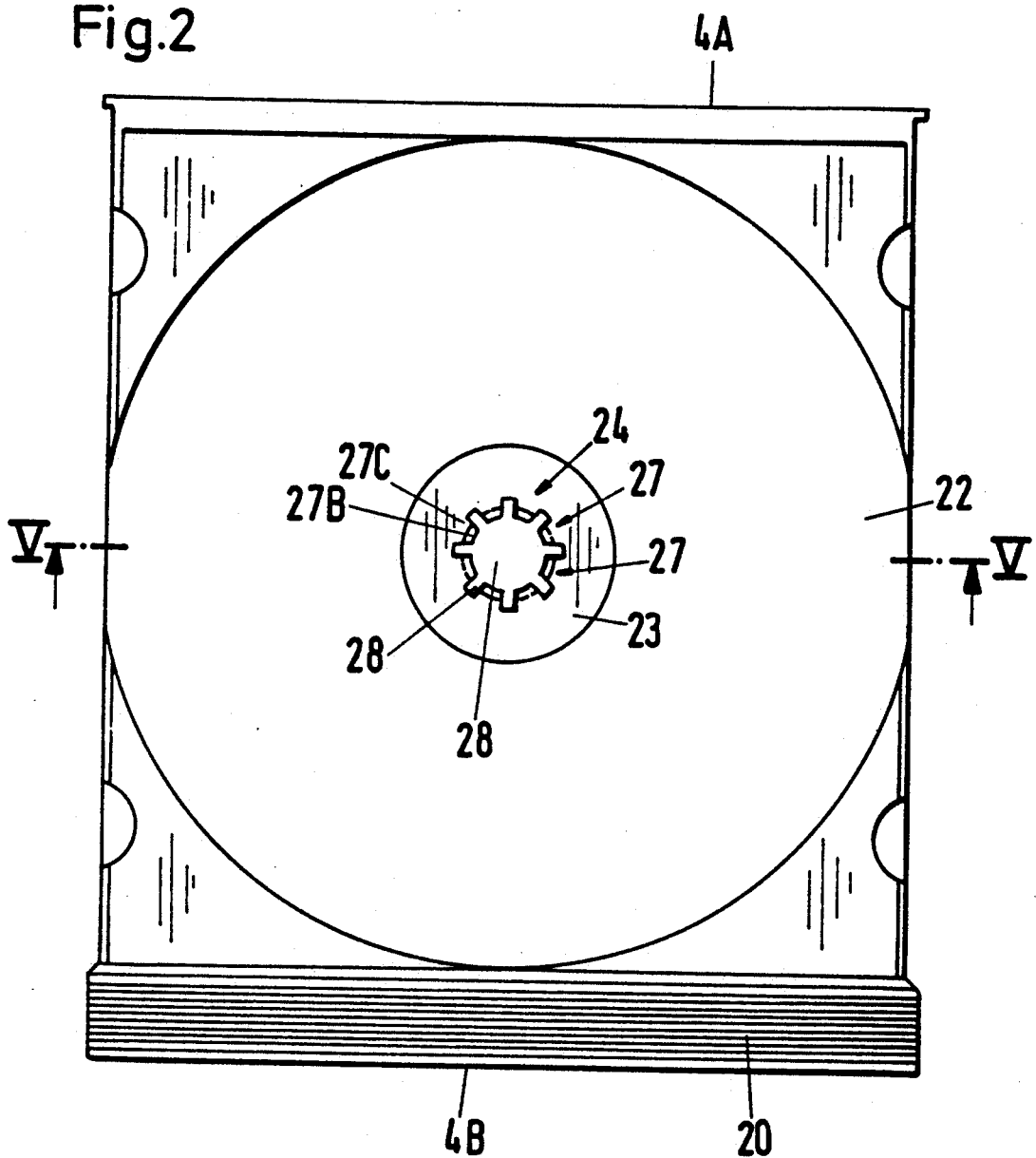

United States Patent [19]

Dunker

[11] Patent Number: 5,284,248
[45] Date of Patent: Feb. 8, 1994

[54] STORAGE CASE AND A DISC HOLDING PART FOR STORAGE CASES FOR ROUND DATA DISCS

[75] Inventor: Petra Dunker, Ratingen, Fed. Rep. of Germany

[73] Assignee: Cartonneries de Thulin, S.A., Thulin, Belgium

[21] Appl. No.: 662,720

[22] Filed: Feb. 28, 1991

[30] Foreign Application Priority Data

Aug. 29, 1988 [DE] Fed. Rep. of Germany ... 8810917[U]
Jun. 22, 1989 [DE] Fed. Rep. of Germany ....... 3920485

[51] Int. Cl.⁵ .......................................... B65D 85/30
[52] U.S. Cl. .................................... 206/444; 206/310
[58] Field of Search .............. 206/444, 310, 312, 313; 312/9, 10

[56] References Cited

U.S. PATENT DOCUMENTS

| | | | |
|---|---|---|---|
| 3,524,540 | 8/1970 | Brown et al. | 206/444 |
| 3,724,652 | 4/1973 | Francini et al. | 206/444 |
| 4,339,037 | 7/1982 | Doering | 206/444 |
| 4,478,335 | 10/1984 | Long et al. | 206/444 |
| 4,479,577 | 10/1984 | Eichner et al. | 206/444 X |
| 4,496,050 | 1/1985 | Kirchner et al. | 206/444 |
| 4,577,756 | 3/1986 | Hennessy | 206/444 |
| 4,634,001 | 1/1987 | Wakelin | 206/444 X |
| 4,655,342 | 4/1987 | Brauner et al. | 206/444 X |
| 4,793,480 | 12/1988 | Gelardi et al. | 206/312 |
| 4,798,284 | 1/1989 | Wakelin | 206/444 X |

FOREIGN PATENT DOCUMENTS

| | | |
|---|---|---|
| 0001353 | 4/1979 | European Pat. Off. . |
| 0086484 | 8/1984 | European Pat. Off. . |
| 0221749 | 5/1987 | European Pat. Off. . |
| 0272042 | 6/1988 | European Pat. Off. . |
| 3425579 | of 0000 | Fed. Rep. of Germany . |
| 2050964 | 5/1971 | Fed. Rep. of Germany . |
| 3414903 | 10/1985 | Fed. Rep. of Germany . |
| 0114631 | 8/1986 | Fed. Rep. of Germany . |
| 3606049 | 9/1986 | Fed. Rep. of Germany ...... 206/444 |
| 2477124 | 2/1980 | France . |
| 2132588 | 7/1984 | United Kingdom . |
| 8601930 | 3/1986 | World Int. Prop. O. .......... 206/444 |

OTHER PUBLICATIONS

German Patent Specification 497,935, published May 15, 1930.
British Patent Specification 822,305 published Oct. 21, 1959.
European Search Report EP 91 12 1746.

Primary Examiner—Steven N. Meyers
Assistant Examiner—Ted Kavanaugh
Attorney, Agent, or Firm—Tarolli, Sundheim & Covell

[57] ABSTRACT

A compact storage case for circular data carriers, comprising a base part, a lid part and a disk holding part. The base part and the lid part are pivotally interconnected along a common edge by a first hinge device. The disk holding part and the base part are pivotally interconnected by a second hinge device arranged on the edge of the base part opposite the first hinge device. The disk holding part has a holder on either side for one circular data carrier per side.

10 Claims, 3 Drawing Sheets

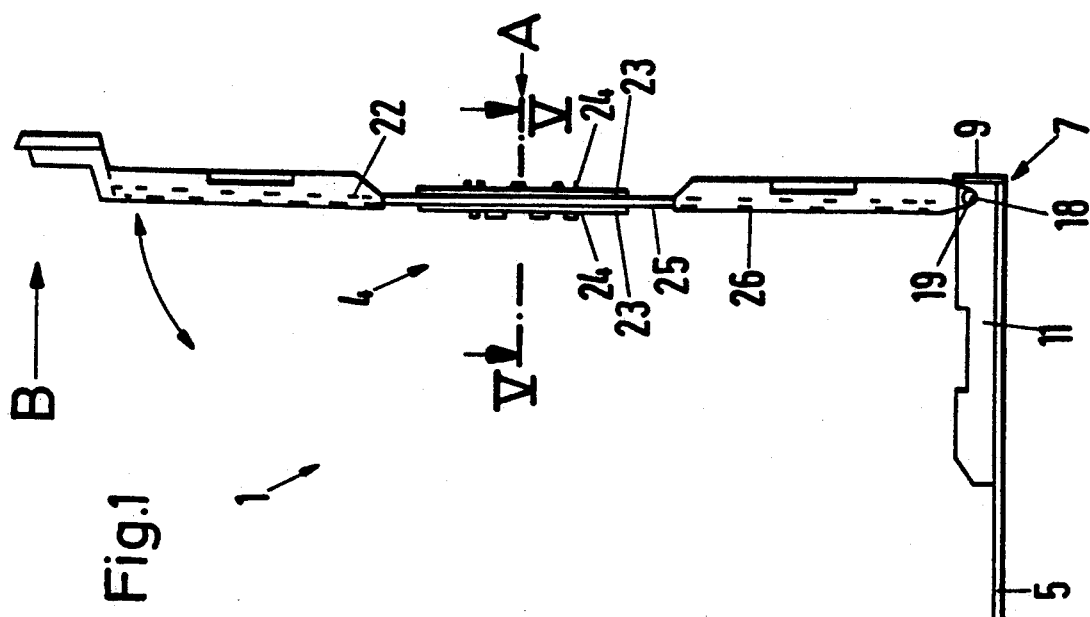
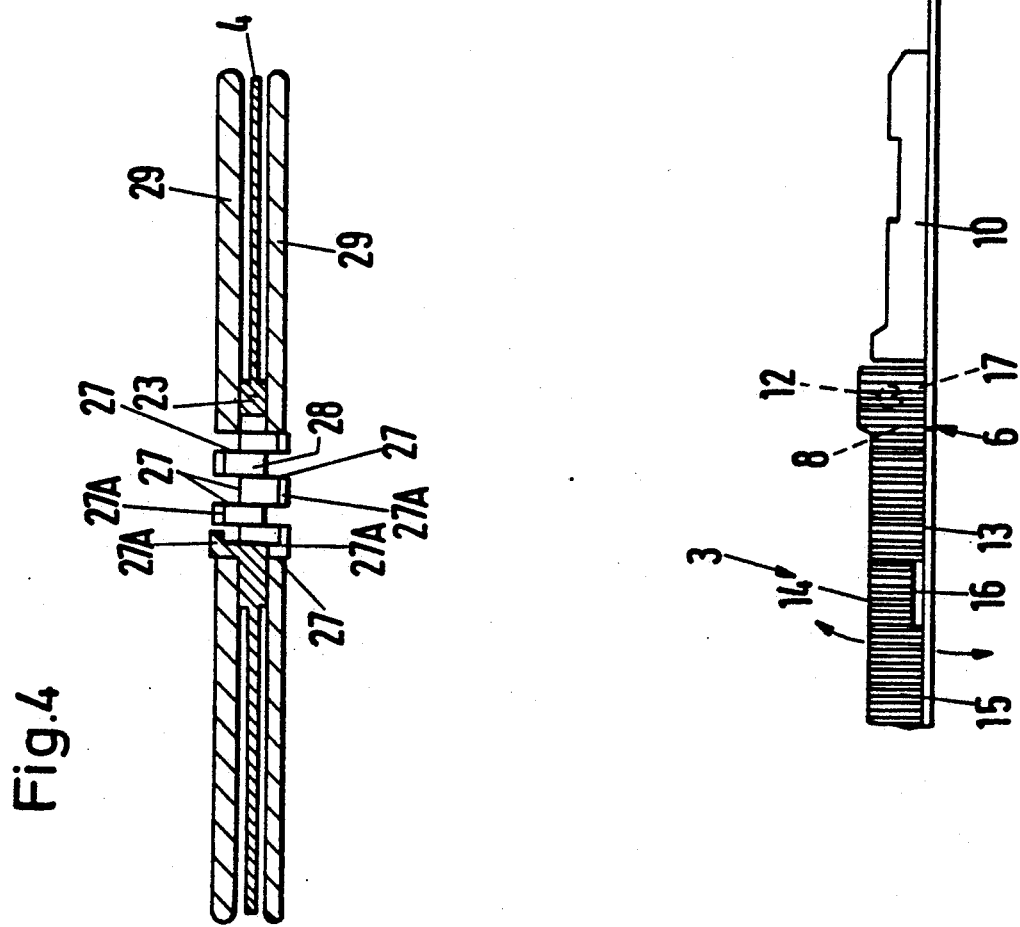

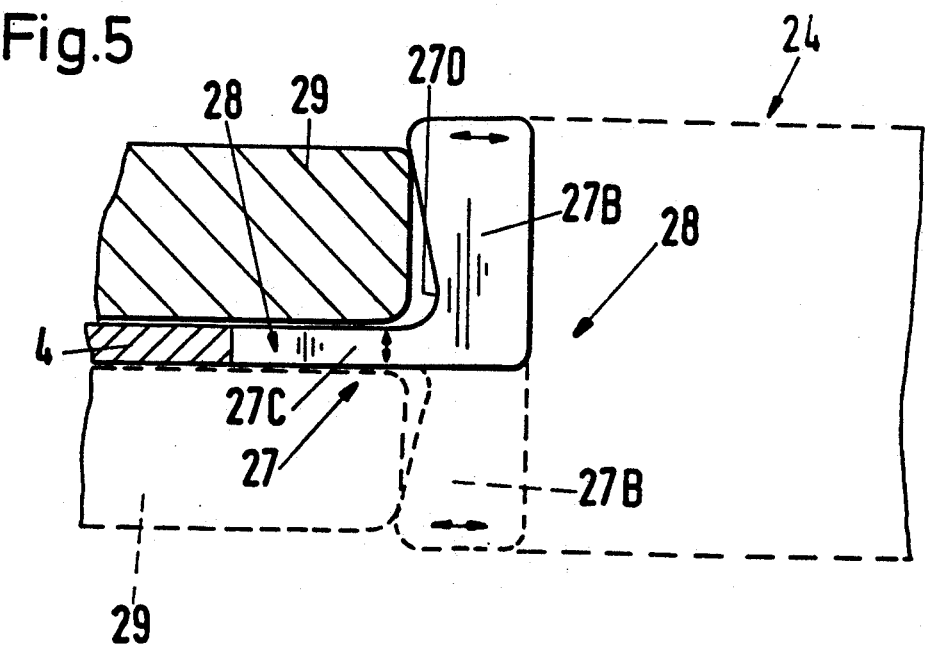
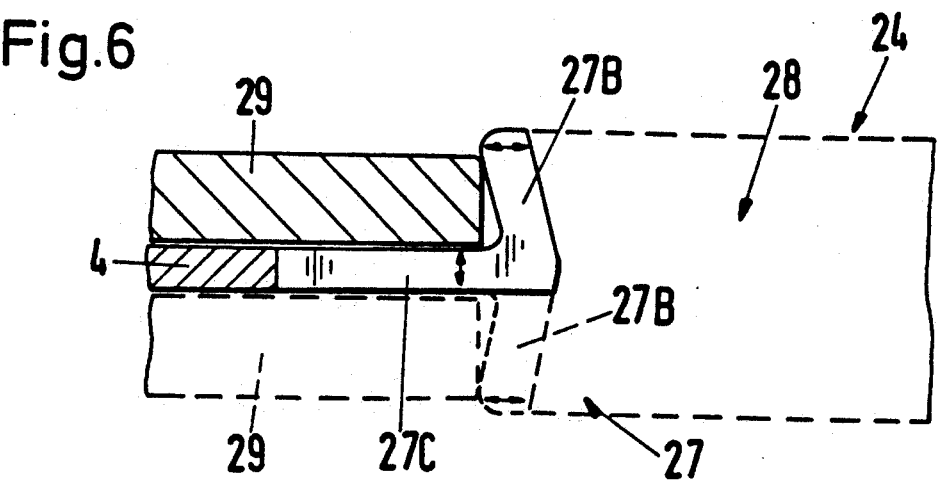
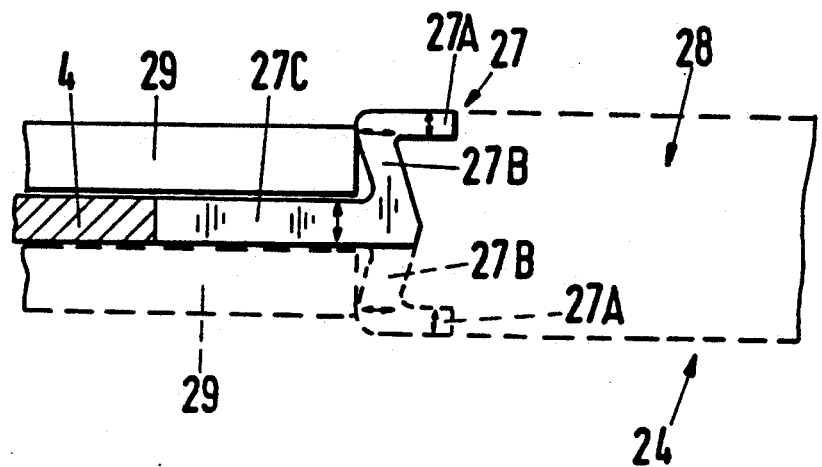

STORAGE CASE AND A DISC HOLDING PART FOR STORAGE CASES FOR ROUND DATA DISCS

This application is a continuation of PCT/EP89/00741 filed Jun. 29, 1989.

The invention concerns a storage case and a disc holding part for storage cases for round data discs, particularly optically readable videodiscs and digital circuit discs, also known as CD's, consisting of a bottom part, a lid part, and a disc holding part. In this case, the disc holding part is arranged between the lid part in the bottom part. Two hinge devices control pivoting motions between the three parts.

It is known (European Patent 0,272,042 A2), e.g., to store and also to sell compact discs (CD's) in storage cases of this type. These types of cases are stored in display cases or similar display or storage furniture Customarily, in addition to the CD they also contain information about the CD. The initially mentioned storage cases are very widely used. As a rule, an information sheet printed on one side is inserted in the bottom part; this sheet is folded on two opposing edges so that the folded areas can be labeled as on the spine of a book. For this purpose, the bottom parts are produced from transparent plastic. The lid parts accept an information pamphlet printed on several sides or also a so-called booklet. These form the cover For this purpose, the lid part also consists of transparent plastic. Therefore, the CD in these known storage cases is visible after opening, i.e. after swinging out the bottom part or lid part. These known storage cases have the disadvantage of having a relatively large volume.

A storage case for two or more CD's is known from the West German patent 3,301,644 A1 in which a center part forming a partition with surrounding end panels is provided for receipt of a CD on each side of the partition. In each case, a bottom part is positioned pivotable by use of hinges on the upper side and the lower side of this center part. Each of these bottom parts can receive an additional CD. The two hinge devices are located on the same edge of the center part. This known storage case is only practical with use for three or four CD's since it has a comparatively large volume. In addition, it has the disadvantage that information can be applied to the end panels of the storage case as on a book spine only with increased cost since the outsides of the two bottom parts are only suitable for the receipt of nonremovable descriptive information when additional disc holding parts are inserted in the two bottom parts; this causes the storage case to have even larger volume. The partition (disc holding part) exhibits circular recesses on both sides for receipt of an index plate with a notch arrangement for one CD. This causes high labor costs and enlarges the volume.

A similar storage case is known from est German Patent 3,414,903 A1 and from the previously specified West German Patent 3,301,644 A1, in which, i.e., the center part is completely encased by the base and lid part and—except for the unstipulated spines—the information areas known for storage cases for single CD's remain usable; however this has other disadvantages. In these known storage cases, i.e., two hinge devices are not arranged parallel to each other but rather are arranged essentially coaxially. Both the bottom part and the disc holding parts, called disc carriers there, of these cases must be provided with longitudinal holes on each side, in which pins engage that are arranged coaxially on the lid part. In these known storage cases, therefore not only exclusively pivoting motions are necessary for opening, but rather pivoting/pushing motions. In this case, jamming of the parts pivoted against each other can easily occur. If it is attempted to reverse this process in case of such a jamming, the danger exists that this is accomplished jerkily and the CD's stored in the cases drop out, become scratched, or undergo other types of damage. The center part (disc holding part) exhibits a central opening that is surrounded on both sides by several pins aligning with each other for receipt and clamping of the CD. It has been shown that this known receipt of the disc is not sufficiently secure against an unintentional loosening of the CD's and is expensive with respect to process engineering.

Proceeding from this, it is the goal of the invention to create a storage case and a disc holding part for storage cases of the initially mentioned type that is designed as a space-saving arrangement that is secure during use. In such a storage case in accordance with the present invention, it has been proven as advantageous to provide the bottom part with end panels on opposite edges that preferably are usable as spines End panels arranged in this manner increase the operational safety of the hinge devices and also facilitate keeping of the sealed storage case dustfree. Likewise, for an operationally safe use of the storage case a limiting device for the pivoting path for the disc holding part in its swung out state has been proven as advantageous since in this manner an unintentional complete tilting out of the disc holding part and the damages of the round information disc resulting therefrom are suppressed effectively.

Advantages achieved by the invention include the following:

protection against the round information carrier, particularly CD's, from falling out of the storage case upon opening or use in the opened state is considerably improved by the novel hinge arrangement;

protection against falling out is improved further by limitation of the opening angle;

the storage case likewise is dusttight, just as the known, commercial storage cases for single CD's;

the storage case comprises only three parts, all of which can be manufactured simply;

these same lid parts can be used in the same manner as for known storage cases for only a single CD; also, only slight change, i.e. two holes as hinge parts, are necessary at the bottom part of these known storage cases;

adjustable furniture for display or private storage of storage cases according to the invention, as used previously for individual cases can be used further without limitation;

now two CD's can be introduced in the same space in which previously only a single CD or other round information disc could be introduced;

in addition, a fourth area that can be provided with information is created in the storage case that is as large as approximately the entire front or back side of the storage case.

Suitable designs in accordance with the present invention ensure a simple production modification and storage of the individual parts as well as an advantageous handling of the storage case or the disc holding part and the best possible protection of the information discs stored therein.

The structural parts used according to the invention are not subject to any special exceptional limitations with respect to their size, design, material selection and engineering concept so that selection criteria known for the respective application area can be used without limitation.

Figure 3:
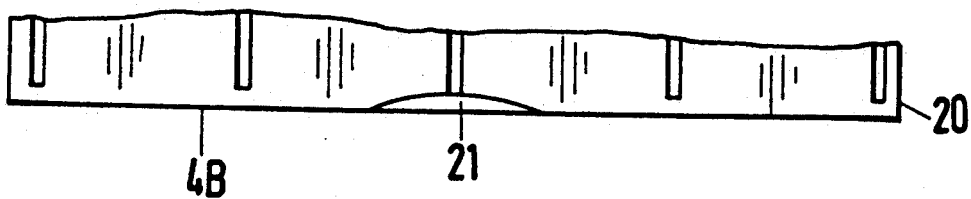

Further details, characteristics and advantages of the subject of the invention are shown from the following description of the accompanying drawings in which a preferred practical form of a storage case having disc holding parts according to the invention is depicted as example. The drawings show:

FIG. 1 a storage case with disc holding part according to the invention in the swung out condition in side view;

FIG. 2 a top view of the same storage case on the upperside of the disc holding part (View A according to FIG. 1);

FIG. 3 a view of the same holding part from below (View B according to FIG. 1) in section; and FIG. 4 representation of a section—corresponding to the section along the line V—V according to FIGS. 1 and 2—for an alternative practical form of a disc holding part.

FIGS. 5-7 represent alternative designs of the bent tab.

In FIG. 1, a storage case is designated overall by 1; the case comprises a bottom part 2, a lid part 3 and a disc holding part 4.

The bottom part 2 in horizontal projection exhibits an essentially rectangular, not completely square base plate 5 that is connected on the narrower edges 6 and 7 of the bottom part 2 in one piece with end panels 8 and 9. At least in the areas of edges 6 and 7, the base plate 5 exhibits flanges 10 and 11 forming the sidewalls along the edges of the relatively longer sides. Holes or circular recesses 12 that form the bottom part 2 of a hinge device are provided in the flanges 10 lying opposite one another (the second flange 10 is covered by the first flange 10) and close to the edge 6 of the base depicted to the left in the drawing.

Lid part 3 exhibits a cover plate 13 that is approximately square in horizontal projection or deviates slightly from the square form and is connected on two opposite edges in one piece with sidewalls 14 or (as the individual parts of the bottom part) is formed as one piece with this. In the depicted practical example, the sidewalls 14 exhibit grooves 15 and recesses 16. The grooves 15 are primarily provided for optical reasons. The recesses 16 are provided at their upper boundary on the backside (inside) of the sidewalls 14 with approximately semicircular bars (not depicted), which serve among other things as spacers in sealed storage cases and that in addition, between the spacers and the inside surface of the base plate 13, can hold descriptive information (not depicted) insertable laterally between the sidewalls 14. In the area of the right edge of the lid part 3 in the drawing, which essentially is coincident with the edge 6 of the bottom part 2 (seen in horizontal projection), the sidewalls 14 of the lid part 3 exhibit hinge pins 17 projecting to the inside which engage in the holes 12 with the formation of a hinge and whose dimensions correspond to those of hole 12. The hinges 12, 17 on both sides (lying behind one another in the drawing) of the bottom part 2 and the lid part 3 jointly form a hinge device by which the lid part is pivotable with respect to the bottom part preferably by an angle of approximately 180°.

Thus far, the bottom part 2, the lid part 3 and the hinge device 12, 17, which as a whole are produced from transparent plastic and form in the sealed state a storage case, preferably for compact discs, in which the two end panels 8 and 9 of the bottom part 2 by insertion of appropriately printed leaflets take over the function of a spine, are generally known and are widely used for the receipt of one CD per storage case.

While the plastic holding part 4 presently is clipped tightly into the bottom part 2 in the known storage cases in such manner that it cannot be withdrawn for all practical purposes without damaging the storage case, a disc holding part according to the invention is pivotable by approximately 90° with respect to bottom part 2 by a second hinge device 18, 19.

In each case, the hinge device comprises a hinge pin 19 on each side, which is arranged on the disc holding part 4 and is combined with it as one piece in the direct vicinity of the edge 7 of bottom part 2, and also a hole 18 for receipt of a hinge pin 19. Such a hole is provided close to edge 7 in each of the two flanges 11 approximately parallel to the edge.

When the disc holding part in the bottom part 2 is swung completely out, the storage case for all practical purposes cannot be distinguished from a conventional storage case for a single CD.

The disc holding part differs from a holder case used widely for the receipt of a single CD in that it is provided with the aforementioned hinge pins and, at the edge of the disc holding part bearing the hinge pins as depicted in top view in FIG. 2, is free of the edges that to some extent prevent the pivoting motion. In this case, the disc holding part in the area of the edge 4A bearing the second hinge device is shaped in such manner that, e.g., the end panel 9 of the bottom part 2 serves as limiting device for the pivoting path of the disc holding part. This is apparent from FIG. 1.

On the edge 4B lying opposite the edge 4A of the disc holding part 4, on which the second hinge device 18, 19 is provided, a grab strip 20 is provided that exhibits a groove 21 on its underside (see FIG. 3), with which the edge 4B can be engaged from below, e.g. with a fingernail, and thus the disc holding part 4 can be lifted off from the bottom part 2 at this edge. In addition, the disc holding part 4 in the area of its upperside depicted in FIG. 2 is designed in similar manner as the known disc holding part for a single CD, i.e. an approximately round indentation 22 is incorporated into the surface and a support ring 23 for the CD and a multipart clamp ring 24 are provided in the central area. The indentation 22 of course is not as deep as in the known storage cases for a single CD. The clamp ring 24 is provided slightly oversized so that with light pressure the central hole of a CD can be shifted over the clamp ring and the CD is then held clamped in this position by the clamp ring. The underside 25 of the disc holding part 4 preferably exhibits a circular indentation 26 for protective receipt of a CD, a further support ring 25 [sic], and a further clamp ring 24 in the same manner as the corresponding appliance on the opposite (upper) side of the disc holding part. The space for the indentation 26 is created by reduction of the depth of the indentation 22.

The disc holding part 4 is preferably manufactured from plastic. For obtaining a clamping force adapted well for the central receipt of two CD's on opposite sides, the arrangement represented schematically in FIG. 4 is recommended. According to arrangement in cross-sectional view, bent tabs 27 are arranged on the circumference of a central opening 28 of the disc holding part 4 alternately in such manner that bent tabs project alternately to above and to below with tab ends 27A projecting into the opening 28 (observed in top view). A tab arrangement of this type is not only very effective, but also can be manufactured with simple injection molding tools without mold slides or the like. Nevertheless, the CD's 29 arranged on both sides of the disc holding part can be held equally secure. Also a frequent removal and reinsertion of the CD's is possible with no problem.

A bent tab 27 in an alternative design to that of FIG. 4 can be seen in FIG. 5. In behalf of simplicity, this figure merely shows a highly enlarged section of the disk holding part 4 and clamp ring 24. While the horizontal leg 27C extending into the plane of the disc holding part 4 corresponds to the practical form according to FIG. 4, the vertical leg 27B is merely provided with a reverse taper, not however with a bent tab end 27A. The reverse taper 27D is not recognizable in FIG. 4 due to the smaller scale of the figure; above all, with clamped CD 29 it [the vertical leg] can be lifted partially or totally by spring action since the tabs 27 are tension-loaded radially to the inside.

In the practical form according to FIG. 4, the additional bent tab ends 27A serve in known manner for relief of the clamping tension acting on the CD.

Further alternatives to FIGS. 4 and 5 are depicted in FIGS. 6 and 7. According to FIG. 6, the size (thickness) of the material of leg 27B (in contrast to FIG. 5) is constant over the leg length with the angles formed by legs 27B and 27C in each case amounting to less than 90°.

When compared to FIG. 6, an additional leg (27A) is provided for the approximately Z-shaped tab 27 according to FIG. 7.

Double arrows in FIGS. 5 to 7 indicate the directions of the spring action of the legs 27A, 27B, and 27C; in behalf of simplicity, the CD's 29 below and clamp ring 24 are represented only by dotted lines.

List of Reference Numbers:
1 Storage case
2 Bottom part
3 Lid part
4 Disc holding part
4A Edge
4B Edge
5 Base plate
6 Edge
7 Edge
8 End panel
9 End panel
10 Flange
11 Flange
12 Hole
13 Cover plate
14 End panel
15 Grooving
16 Recess
17 Hinge pin
18 Hole
19 Hinge pin
20 Grab strip
21 Recess
22 Indentation
23 Support ring
24 Clamp ring
25 Underside
26 Indentation
27 Tabs
27A Tab ends
28 Openings
29 CD A View
B View

I claim:

1. Storage case (1) for round information discs (29), comprising a bottom part (2), a lid part (3) and a disc holding part (4) in which the bottom part (2) with respect to the lid part is pivotable by means of a first hinge device (12, 17), and the disc holding part with respect to the bottom part is pivotable by a second hinge device (18, 19), the disc holding part having opposite sides facing away from each other, each side of the disc holding part including means for providing forces which clamp a round information disc to hold the round information disc adjoining the respective side of the disc holding part, and the second hinge device being arranged on the edge (7) of the bottom part lying opposite the first hinge device, the disc holding part in swung out condition can be brought to a stop by a device limiting the pivoting path, the device limiting the pivoting part being provided on a front panel (9) of the bottom part that is usable particularly as a spine.

2. Storage case according to claim 1 wherein the maximum pivoting angle between the disc holding part (4) and the bottom part (2) amounts to 120°, preferably approximately 80° to 100°.

3. Storage case (1) for round information discs (29), comprising a bottom part (2), a lid part (3) and a disc holding part (4) in which the bottom part with respect to the lid part is pivotable by means of a first hinge device (12, 17), and the disc holding part with respect to the bottom part is pivotable by a second hinge device (18, 19), the lid part (3) and the bottom part (2) up to the second hinge device (18, 19) being commercial parts of a storage case (1) for a single round data disc, the disc holding part having opposite sides facing away from each other, each side of the disc holding part including means for providing forces which clamp a round information disc to hold the round information disc adjoining the respective side of the disc holding part, and the second hinge device being arranged on the edge (7) of the bottom part lying opposite the first hinge device.

4. Storage case according to claim 3 wherein a recess (21) is defined between the bottom part (2) and the disc holding part (4) on the edge (6) of the bottom part lying opposite the second hinge device (18, 19).

5. Storage case according to claim 3 wherein the second hinge device (18, 19) is arranged inside the bottom part (2) beside a front panel (9) parallel to the second hinge device.

6. Storage case according to claim 3 wherein the bottom part (2) on is edge (6) receiving the first hinge device (12, 17) includes end panels (8, 9) usable as spines.

7. Storage case according to claim 3 wherein the disc holding part (4) is received or is receivable in the bottom part (2).

8. Storage case according to claim 3 wherein the disc holding part (4) in swung out condition can be brought to a stop by a device limiting the pivoting path.

9. Storage case according to claim 3 wherein the means for providing forces includes a plurality of elements in the form of tabs extending through a central opening in the round information disc, the tabs providing forces which act in the radial direction of the round information disc to hold the round information disc adjoining the respective side of the disc holding part.

10. Storage case according to claim 9 wherein the tabs provide forces which act in the axial direction of the round information disc to hold the round information disc adjoining the respective side of the disc holding part.

* * * * *